United States Patent
Tanaka

(10) Patent No.: US 8,284,262 B2
(45) Date of Patent: Oct. 9, 2012

(54) SHAKE CORRECTION DEVICE, SHAKE CORRECTION METHOD, AND IMAGING APPARATUS

(75) Inventor: Kazato Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 373 days.

(21) Appl. No.: 12/592,025

(22) Filed: Nov. 18, 2009

(65) Prior Publication Data

US 2010/0149351 A1 Jun. 17, 2010

(30) Foreign Application Priority Data

Dec. 11, 2008 (JP) ................ P2008-315429

(51) Int. Cl.
H04N 5/228 (2006.01)
(52) U.S. Cl. .................................. 348/208.2
(58) Field of Classification Search .. 348/208.1–208.11, 348/342, 345
See application file for complete search history.

(56) References Cited

U.S. PATENT DOCUMENTS

| | | | |
|---|---|---|---|
| 5,243,462 A | 9/1993 | Kobayashi et al. | |
| 5,845,156 A | 12/1998 | Onuki | |
| 6,614,994 B2 * | 9/2003 | Ohishi et al. | 396/55 |
| 6,940,542 B2 * | 9/2005 | Kitazawa et al. | 348/208.99 |
| 7,209,165 B2 | 4/2007 | Ishikawa | |
| 7,324,134 B2 * | 1/2008 | Sato et al. | 348/208.2 |
| 2005/0128309 A1 * | 6/2005 | Tomita et al. | 348/208.7 |
| 2006/0132612 A1 * | 6/2006 | Kawahara | 348/208.6 |

FOREIGN PATENT DOCUMENTS

| | | |
|---|---|---|
| JP | 02-287423 A | 11/1990 |
| JP | 05-066450 A | 3/1993 |
| JP | 07218967 A | 8/1995 |
| JP | 10-079883 A | 3/1998 |
| JP | 10-108062 A | 4/1998 |
| JP | 10-153809 A | 6/1998 |
| JP | 11-352536 A | 12/1999 |
| JP | 2004-117418 A | 4/2004 |
| JP | 2005-303933 A | 10/2005 |
| JP | 2006074402 A | 3/2006 |

OTHER PUBLICATIONS

Office Action from Japanese Application No. 2008-315429, dated Oct. 19, 2010.

* cited by examiner

Primary Examiner — Trung Diep
(74) Attorney, Agent, or Firm — Lerner, David, Littenberg, Krumholz & Mentlik, LLP

(57) ABSTRACT

A shake correction device includes a shake detection unit detecting shake so as to generate a shake detection signal, a driving unit displacing a relative positional relationship between a lens unit and an imaging device with respect to an optical axis so as to displace the position on the imaging surface of an optical image formed on an imaging surface of the imaging device, a displacement detection unit detecting a displacement state of the correction lens unit or the imaging device, a filter processing unit performing a filter process of the shake detection signal, and a correction control unit displacing the relative positional relationship between the lens unit and the imaging device according to the filter-processed shake detection signal so as to correct the shake of the optical image on the imaging surface generated by the shake detected by the shake detection unit.

8 Claims, 13 Drawing Sheets

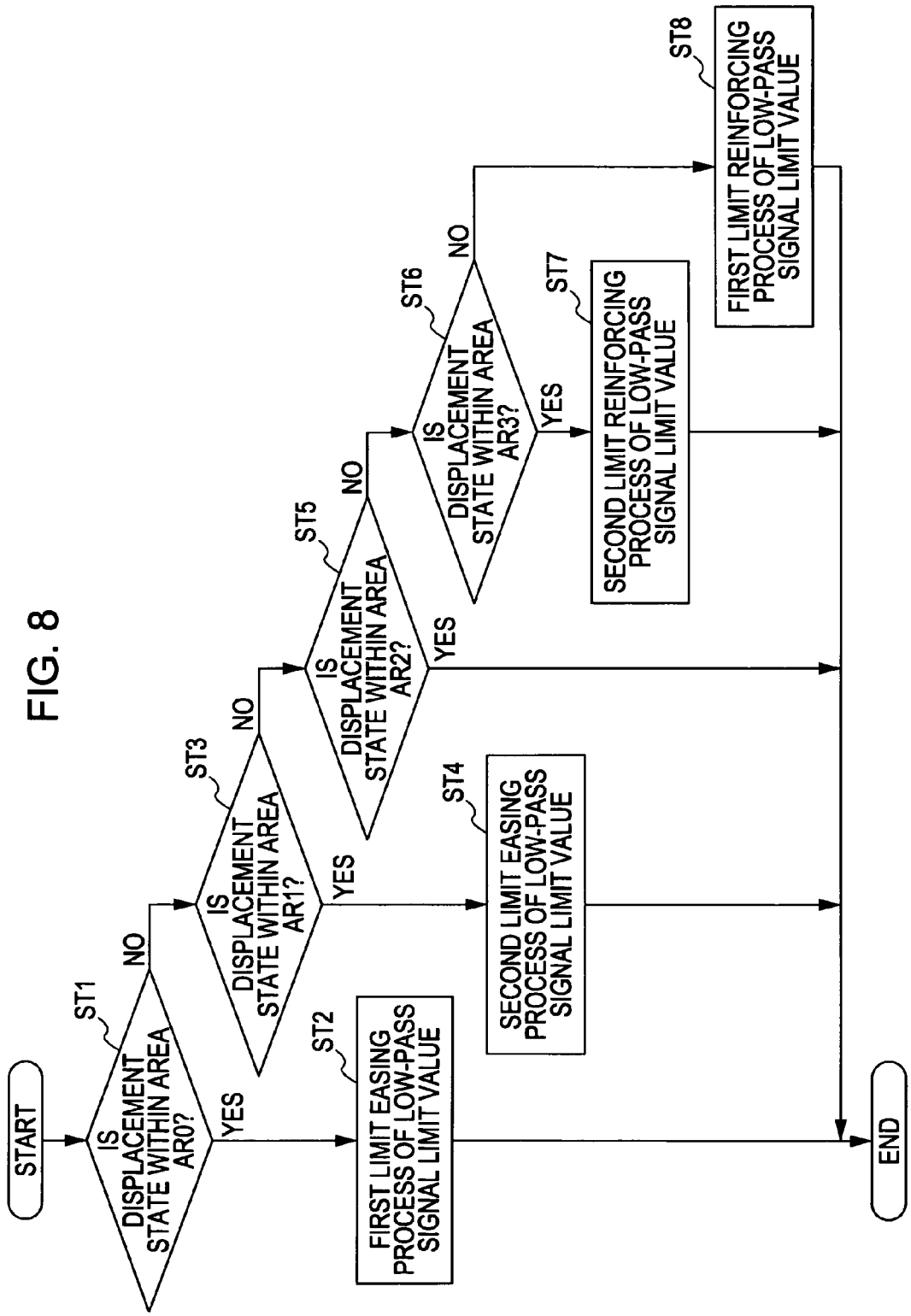

SHAKE CORRECTION DEVICE, SHAKE CORRECTION METHOD, AND IMAGING APPARATUS

CROSS-REFERENCE TO RELATED APPLICATION

The present application claims priority from Japanese Patent Application No. JP 2008-315429 filed in the Japanese Patent Office on Dec. 11, 2008, the entire content of which is incorporated herein by reference.

BACKGROUND OF THE INVENTION

1. Field of the Invention

The present invention relates to a shake correction device, a shake correction method and an imaging apparatus and, more particularly, to performing of suitable shake correction using a correction area effectively.

2. Description of the Related Art

In the related art, in a shake correction mechanism of an imaging apparatus, shake is corrected by displacing a correction optical system, for example, a correction lens, without moving the position of an optical image on an imaging surface by shake of the device.

In such a shake correction mechanism, an angle of an optical axis which is correctable using the correction lens is increased if a zoom position is on a wide side rather than on the telephoto side. In addition, when the correction amount of the correction lens is identical, the correction angle corrected using the correction lens on the wide side is larger than that on the telephoto side. The large correction angle on the wide side indicates that the aberration of an imaging optical system is also increased on the wide side as described in Japanese Unexamined Patent Application Publication No. 5-66450 (corresponding U.S. Pat. No. 5,845,156). Accordingly, in Japanese Unexamined Patent Application Publication No. 5-66450, by limiting the displacement range of the correction lens according to a focal distance, shake correction when the optical aberration is large is prevented such that panning operability is improved.

In Japanese Unexamined Patent Application Publication No. 2-287423 (corresponding U.S. Pat. No. 5,243,462), a correction optical system is largely displaced in one direction when a panning/tilting operation is performed such that the correction optical system is prevented from being largely displaced and the correction optical system is prevented from colliding with the inside wall of a lens barrel by large displacement. In Japanese Unexamined Patent Application Publication No. 2-287423, centering force is generated with respect to the correction optical system in correspondence with the position of a lens such that shake correction is performed within a range which does not reach a shake correction limit.

In addition, in Japanese. Unexamined Patent Application Publication No. 2004-117418 (correspondence: U.S. Pat. No. 7,209,165), shake correction is performed using a shake frequency. In Japanese Unexamined Patent Application Publication No. 2004-117418, a shake correction unit is controlled by calculating a shake correction signal based on a shake detection signal using a high-pass band variable unit. When a high frequency within a shake correction control range is detected, the shake correction of the high frequency is preferentially performed such that deterioration of resolution of a photographed image due to shake of the high frequency band is reduced. In addition, if a high frequency exceeding the shake correction control range is detected, a high-pass band of a high-pass band variable unit is gradually shifted from a defined value to a high-pass side such that shake correction may not be performed. Accordingly, shake correction is stopped, and the deterioration of the resolution of the photographed image due to the shake of the high frequency of a band where a shake correction control may not be performed and disturbance of the photographed image are reduced.

SUMMARY OF THE INVENTION

If the control unit for centering the correction optical system is used, centering force which does not reach a correction limit even when shake is large is generated. In this case, if the magnitude of the shake is normal, centering force according to the position of the lens is generated even when centering is not necessary. Accordingly, camera shake correction performance of relatively small shake may deteriorate.

In addition, when a shake correction signal is calculated based on a shake detection signal by a high-pass band variable unit so as to perform shake correction, a low frequency component of the shake frequency due to the action of a photographer while walking, which is not considered in the related art, may be cut off by the high-pass band variable unit. If the low frequency component of the shake frequency is cut off, it is difficult to perform control for effectively eliminating shake even when a correction optical system having a correction range capable of eliminating a large shake operation is used.

It is desirable to provide a shake correction device, a shake correction method and an imaging apparatus, which is capable of performing suitable shake correction using a correction area effectively.

According to an embodiment of the present invention, there is provided a shake correction device including: a shake detection unit detecting shake so as to generate a shake detection signal; a driving unit displacing a relative positional relationship between a lens unit and an imaging device with respect to an optical axis so as to displace the position on the imaging surface of an optical image formed on an imaging surface of the imaging device; a displacement detection unit detecting a displacement state of the correction lens unit or the imaging device; a filter processing unit performing a filter process of the shake detection signal; and a correction control unit displacing the relative positional relationship between the lens unit and the imaging device according to the filter-processed shake detection signal so as to correct the shake of the optical image on the imaging surface generated by the shake detected by the shake detection unit, wherein the filter processing unit changes filter processing characteristics according to the displacement state detected by the displacement detection unit, and limits the shake correction of the optical image as the detected displacement state becomes close to a displacement limit.

In the embodiment of the present invention, the filter processing unit may limit a low frequency component of the shake detection signal as the displacement state becomes close to the displacement limit so as to limit the shake correction of the low frequency component. For example, the predetermined low frequency component of the shake detection signal is limited as the displacement state becomes close to the displacement limit so as to limit the shake correction of the low frequency component. The filter processing unit performs a high-pass filter process, and increases a cutoff frequency of the high-pass filter process as the displacement state becomes close to the displacement limit so as to limit the shake correction of the low frequency component having a lower frequency than the cutoff frequency. The filter processing unit sequentially reinforces the limit of the low frequency component when the displacement state is close to the displacement limit rather than a predetermined state and sequentially eases the limit when the displacement state is separated from the displacement limit rather than the predetermined state.

According to another embodiment of the present invention, there is provided a shake correction method including the steps of: detecting shake so as to generate a shake detection signal by a shake detection unit; displacing a relative positional relationship between a lens unit and an imaging device with respect to an optical axis so as to displace the position on the imaging surface of an optical image formed on an imaging surface of the imaging device, by a driving unit; detecting a displacement state of the correction lens unit or the imaging device, by a displacement detection unit; performing a filter process of the shake detection signal, by a filter processing unit; and displacing the relative positional relationship between the lens unit and the imaging device according to the filter-processed shake detection signal so as to correct the shake of the optical image on the imaging surface generated by the shake detected by the shake detection unit, by a correction control unit, wherein, in the step of performing the filter process, filter processing characteristics are changed according to the displacement state detected in the step of detecting the displacement state, and the shake correction of the optical image is limited as the detected displacement state becomes close to a displacement limit.

According to another embodiment of the present invention, there is provided an imaging apparatus including: a shake detection unit detecting shake so as to generate a shake detection signal; a driving unit displacing a relative positional relationship between a lens unit and an imaging device with respect to an optical axis so as to displace the position on the imaging surface of an optical image formed on an imaging surface of the imaging device; a displacement detection unit detecting a displacement state of the correction lens unit or the imaging device; a filter processing unit performing a filter process of the shake detection signal; a signal processing unit performing a camera signal process using an image signal generated by the imaging device; and a correction control unit displacing the relative positional relationship between the lens unit and the imaging device according to the filter-processed shake detection signal so as to correct the shake of the optical image on the imaging surface generated by the shake detected by the shake detection unit, wherein the filter processing unit changes filter processing characteristics according to the displacement state detected by the displacement detection unit, and limits the shake correction of the optical image as the detected displacement state becomes close to a displacement limit.

According to the embodiments of the present invention, the filter processing characteristics of the shake detection signal are changed according to the displacement state detected by the displacement detection unit, and the shake correction of the optical image is limited as the detected displacement state becomes close to the displacement limit. To this end, when the displacement state is separated from the displacement limit, the shake correction is performed using a correction area effectively, with respect to small shake or large shake such as when an image is picked up while walking. In addition, shake correction is limited as the displacement state becomes close to the displacement limit. For example, shake correction is performed with respect to small shake such as camera shake, shake correction is limited with respect to large shake such as when an image is picked up while walking, and the correction lens unit is prevented from colliding with the inside wall of a lens barrel. Accordingly, suitable shake correction can be performed using a correction area effectively.

BRIEF DESCRIPTION OF THE DRAWINGS

FIG. 8 is a flowchart showing a switching operation of a low-pass signal limit value.

DESCRIPTION OF THE PREFERRED EMBODIMENTS

Hereinafter, the embodiments of the present invention will be described. In addition the description will be made in the following order.

Figure 1:
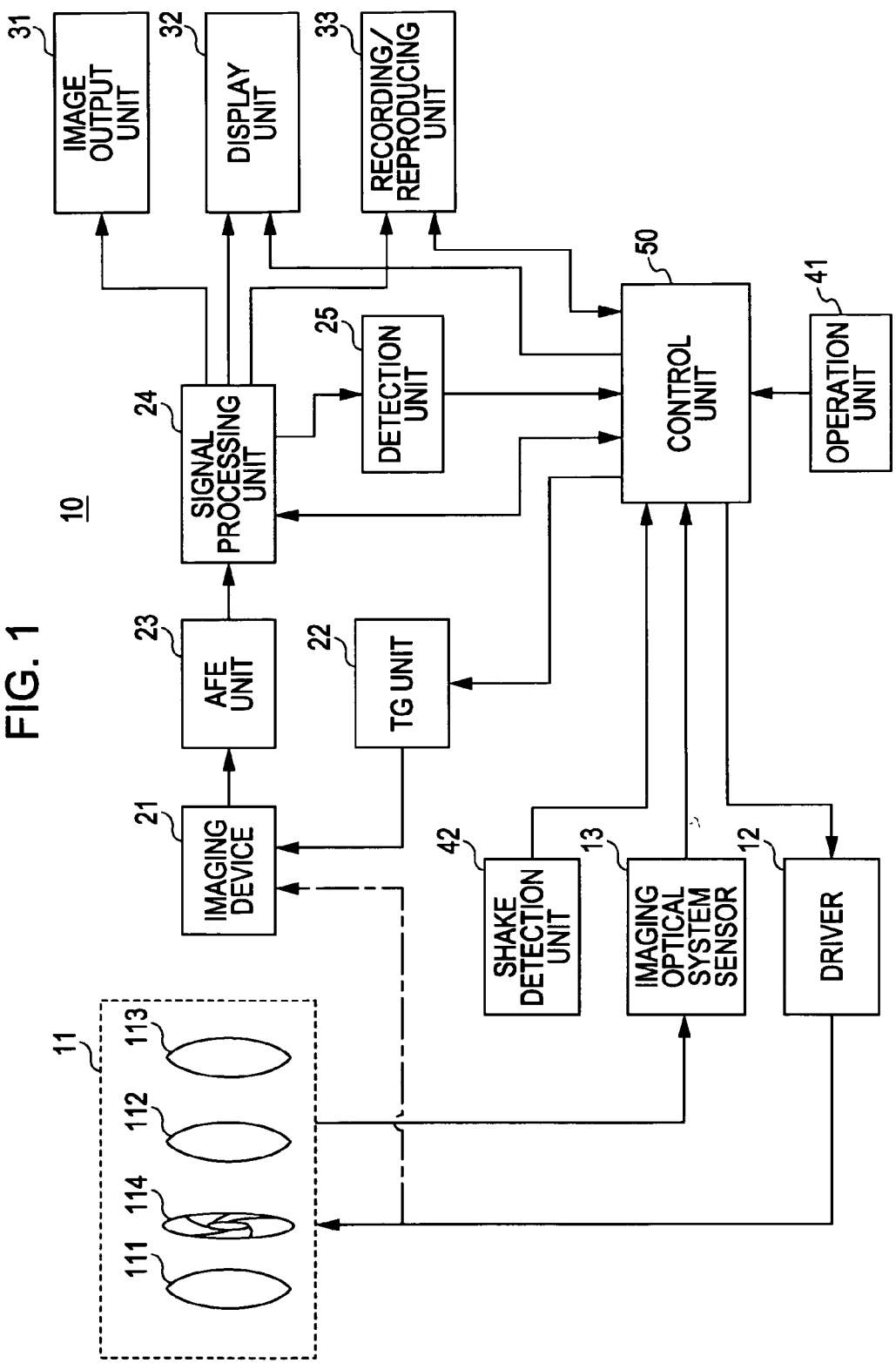
FIG. 1 is a diagram showing the configuration of an imaging apparatus.

1. Configuration When Shake Correction Device is Applied to Imaging Apparatus
2. Operation of Shake Correction Device
3. Configuration of Arithmetic Processing Unit
4. First Configuration of Filter Processing Unit
5. Operation of First Configuration of Filter Processing Unit
6. Second Configuration of Filter Processing Unit
7. Operation of Second Configuration of Filter Processing Unit
8. Third Configuration of Filter Processing Unit 1. Configuration when Shake Correction Device is Applied to Imaging Apparatus FIG. 1 is a block diagram showing the configuration of an imaging apparatus using a shake correction device according to an embodiment of the present invention. The imaging apparatus 10 includes an imaging optical system block 11, a driver 12, an imaging optical system sensor 13, an imaging device 21, a timing signal generation (TG) unit 22, an Analog Front End (AFE) unit 23, a signal processing unit 24, and a detection unit 25. In addition, the imaging apparatus 10 further includes an image output unit 31, a display unit 32, a recording/reproducing unit 33, an operation unit 41, a shake detection unit 42, and a control unit 50.

The imaging optical system block 11 includes a zoom lens 111 for varying magnification, a focusing lens 112 for performing focusing, a correction lens unit 113 for moving the position of an optical image formed on an imaging surface of the below-described imaging device 21 on the imaging surface, and a diaphragm mechanism 114 for adjusting the quantity of light.

The correction lens unit 113 includes a correction lens provided such that an optical axis thereof coincides with an optical axis of the imaging optical system and an actuator for displacing the correction lens in a direction perpendicular to the optical axis of the imaging optical system. The correction lens unit having the above-described configuration displaces the correction lens in the direction perpendicular to the optical axis of the imaging optical system and moves the position on the imaging surface of the optical image formed on the imaging surface.

The correction lens unit 113 may use a variable vertex prism unit. The variable vertex prism unit is obtained by providing an incident end plate and a light-emitting end plate having translucency on the end surface of a bendable cylinder such as a bellows and enclosing a translucent liquid having a desired refractive index in the cylinder. If the variable vertex prism unit is used, one of the incident end plate or the light-emitting end plate is fixed and the other thereof is driven by the actuator, thereby forming an optical wedge. The correction lens unit having such a configuration displaces, for example, the inclined angle of the light-emitting end plate relative to the incident end plate and moves the position on the imaging surface of the optical image formed on the imaging surface.

The driver 12 drives the zoom lens 111 or the focusing lens 112 and the actuator of the correction lens unit 113 based on a lens control signal from the below-described control unit 50. In addition, the driver 12 drives the diaphragm mechanism 114 based on a diaphragm control signal from the control unit 50.

The imaging optical system sensor 13 detects the lens position of the zoom lens 111 or the focusing lens 112, the displacement state of the correction lens unit 113 (equal to the displacement position or the correction angle of the correction lens unit 113) and the setting position of the diaphragm mechanism 114 and supplies the position signal to the control unit 50.

As the imaging device 21, for example, an imaging device such as a Charge Coupled Device (CCD) or a Complementary Metal Oxide Semiconductor (CMOS) image sensor is used. The imaging device 21 converts a subject image formed on the imaging surface by the imaging optical system block 11 into an electrical signal and outputs the electrical signal to the AFE unit 23.

The TG unit 22 generates various types of driving pulses necessary for outputting the electrical signal indicating the picked-up image of the imaging device 21 and an electronic shutter pulse for controlling a charge accumulation time of the imaging device 21.

The AFE unit 23 performs a noise eliminating process such as a Correlated Double Sampling (CDS) process and an Automatic Gain Control (AGC) process of setting an imaging signal to a desired signal level with respect to the electrical signal (image signal) output from the imaging device 21. The AFE unit 23 converts an analog imaging signal subjected to the noise eliminating process and the gain control process into a digital signal and outputs the digital signal to the signal processing unit 24.

The signal processing unit 24 performs a camera signal preprocess, a cameral signal process, a resolution conversion process, a compression/expansion process, or the like. In the camera signal preprocess, with respect to the image signal supplied from the AFE unit 23, a defect correction process of correcting the signal of a defect pixel of the imaging device 21, a shading correction process of correcting dropping of the quantity of peripheral light of the lens, or the like are performed. In the camera signal process, a process of adjusting white balance or correcting brightness or the like is performed. In a digital camera or the like, red, green and blue signals may be obtained by one imaging device, by providing a color filter array on the front surface of the imaging device. In this case, in the camera signal process, a demosaic process is performed and color signals missing in the pixels are generated by interpolation using the signals of the peripheral pixels. In the resolution conversion process, the image signal subjected to the cameral signal process or the expansion-decoded image signal is converted into predetermined resolution. In the compression/expansion process, the image signal after the camera signal process or the image signal subjected to the resolution conversion process is compression-encoded so as to form, for example, a JPEG-encoded signal. In the compression/expansion process, the JPEG-encoded signal is expansion-decoded. In addition, in the compression/expansion process, the image signal of a still image may be compression-encoded by a method different from the JPEG method. In addition, in the compression/expansion process, the image signal of a moving image may be compression-encoded by a moving image compression method.

The detection unit 25 detects the brightness level or the focusing state of a picked-up image using the imaging signal supplied to the signal processing unit 24, and generates and supplies a detected signal indicating the brightness level or the focusing state to the control unit 50.

The image output unit 31 converts the image signal processed by the signal processing unit 24 into an image signal with a format corresponding to an external device connected to the imaging apparatus 10 and outputs the image signal.

The display unit 32 displays the image picked up by the imaging apparatus 10 or the pick-up image reproduced by the recording/reproducing unit 33. In addition, the display unit 32 performs a menu display for setting the imaging device 10 or the like.

In the recording/reproducing unit 33, for example, a recording medium such as a flash memory, an optical disk, or a magnetic tape is used. The recording/reproducing unit 33 records the image signal of the pick-up signal output from the signal processing unit 24 or the encoded signal on the recording medium. In addition, the recording/reproducing unit performs a process of reading and supplying the image signal recorded on the recording medium to the image output unit 31 or the display unit 32 or a process of reading and supplying the encoded signal recorded on the recording medium to the signal processing unit 24. The recording/reproducing unit 33 is not limited to the configuration in which the recording medium is attached or detached. For example, as the recording/reproducing unit 33, a hard disk device or the like may be mounted.

The operation unit 41 includes an operation button or a touch panel provided on the screen of the display unit 32. The operation unit 41 generates and supplies an operation signal according to a user operation to the control unit 50.

The shake detection unit 42 includes a shake detection sensor for detecting the shake of the imaging apparatus 10, such as a gyro sensor. The shake detection sensor includes a yawing angular speed sensor for detecting, for example, an angular speed according to the shake of a yawing direction and a pitching angular speed sensor for detecting, for example, an angular speed according to the shake of a pitching direction. In the shake detection unit 42, a processing circuit for performing signal processing of the detection signal is provided. In the processing circuit, for example, unnecessary signal components such as a higher frequency component than a noise component or a signal component of an angular speed value, a resonance frequency component and the like are eliminated from the detection signal. In the processing circuit, a process of correcting drift generated due to a temperature variation or a time variation, a process of converting the detection signal into a digital signal and supplying the digital signal to the control unit 50 or the like are performed. If the detection signal is output from the shake detection unit 42 as the analog signal, the control unit 50 may convert the shake detection signal into a digital signal and use the digital signal.

In addition, the shake detection unit 42 is not limited to the configuration using the angular speed sensor. For example, shake may be detected using the acceleration sensor or the like. If the acceleration speed sensor is used, the output of the acceleration sensor may be integrated so as to calculate a speed. Since a movement distance may be calculated by integrating the speed, the level of shake based on the output of the acceleration sensor may be determined.

The control unit 50 includes a Central Processing Unit (CPU), a memory or the like. In the memory, a program executed by the CPU or a variety of data is stored. As the memory, for example, a non-volatile memory such as an Electronically Erasable and Programmable ROM (EEPROM) or a flash memory is used. The CPU of the control unit 50 executes the program stored in the memory and controls the units based on the variety of data stored in the memory or the operation signal supplied from the operation unit 41 such that the action of the imaging apparatus 10 becomes the action according to the user operation. For example, the control unit 50 controls the action of the TG unit 22 and records an encoded signal of a still screen picked up with a desired shutter speed on the recording medium of the recording/reproducing unit 33, when the user performs a shutter operation. When a moving image recording starting operation is performed, an encoded signal of a moving image or the like is recorded on the recording medium of the recording/reproducing unit 33.

The control unit 50 generates and supplies a lens control signal or a diaphragm control signal to the driver 12 based on the position signal supplied from the imaging optical system sensor 13 or the detection signal supplied from the detection unit 25. Accordingly, the focusing lens 112 or the diaphragm mechanism 114 is driven by the driver 12 such that a picked-up image focused with a desired brightness is obtained. The control unit 50 generates and supplies the lens control signal to the driver 12 and drives the zoom lens 111 such that a picked-up image with a desired zoom ratio is obtained, when the user performs a zoom operation.

In the imaging apparatus 10 having such a configuration, the shake correction device includes the imaging optical system block 11, the driver 12, the imaging optical system sensor 13, the shake detection unit 42 and the control unit 50. The control unit 50 generates the lens control signal for driving the correction lens unit 113 such that the picked-up image is not shaken, based on the detection signal from the shake detection unit 42 or the position signal supplied from the imaging optical system sensor 13, and supplies the lens control signal to the driver 12. The driver 12 drives the correction lens unit 113 of the imaging optical system block 11 based on the lens control signal. By driving the correction lens unit 113 based on the detection signal from the shake detection unit 42, the relative positional relationship between the lens unit and the imaging device is displaced with respect to the optical axis and the position of the optical image formed on the imaging surface of the imaging device is moved onto the imaging surface, thereby performing shake correction. In addition, the shake correction device may drive the imaging device 21 based on the detection signal as denoted by a dashed-dotted line of FIG. 1 and displace the relative positional relationship between the lens unit and the imaging device with respect to the optical axis so as to perform shake correction, instead of an operation for displacing the correction lens unit 113 so as to perform shake correction. In the following description, the case of displacing the relative positional relationship between the lens unit and the imaging device with respect to the optical axis by moving the correction lens unit 113 and performing shake correction will be described.

2. Operation of Shake Correction Device

Next, the operation of the shake correction device will be described. In the imaging optical system having a shake correction function, it is preferable that aberration does not occur over an overall zoom area even when the correction lens unit is displaced to a maximum displacement range. However, it is difficult to prevent completely the occurrence of aberration by various restrictions. Meanwhile, since the necessity of the shake correction is important in the telephoto side rather than the wide side, in the design of the imaging optical system, the aberration of the telephoto side is generally decreased. As a result, the aberration of the wide side during shake correction is increased.

Figure 2:
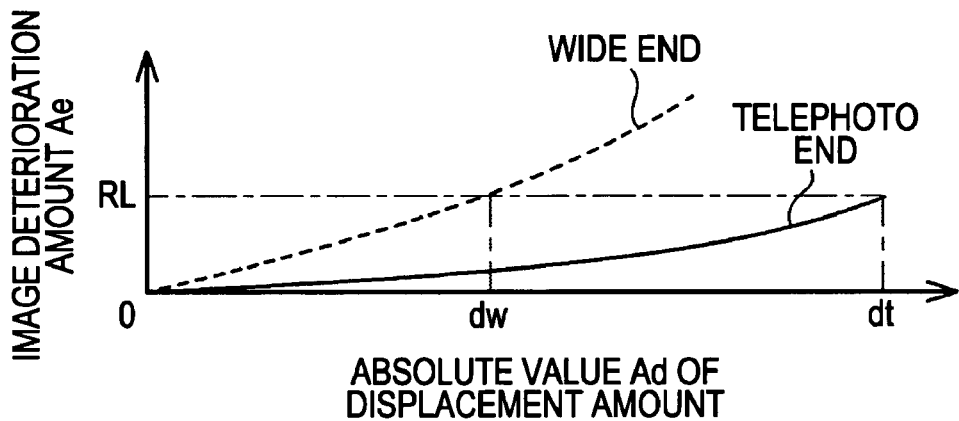
FIG. 2 is a diagram showing a situation in which aberration occurs with respect to a displacement amount of a correction lens unit.

FIG. 2 is a diagram showing a situation in which aberration occurs with respect to the displacement amount of the correction lens unit. In addition, in FIG. 2, a horizontal axis denotes the absolute value Ad of the displacement amount and a vertical axis denotes an image deterioration amount Ae corresponding to an aberration amount.

Here, the relationship between the displacement amount and the image deterioration amount at the telephoto end has, for example, characteristics denoted by a solid line. In addition, the relationship between the displacement amount and the image deterioration amount at the wide end has, for example, characteristics denoted by a dotted line. That is, in order to suppress the image deterioration amount Ae to "RL", the absolute value of the displacement amount at the telephoto end is limited to a displacement range of "dt". In addition, the absolute value of the displacement amount at the wide end is limited to a displacement range of "dw" which is narrower than "dt" at the telephoto end.

Figure 3:
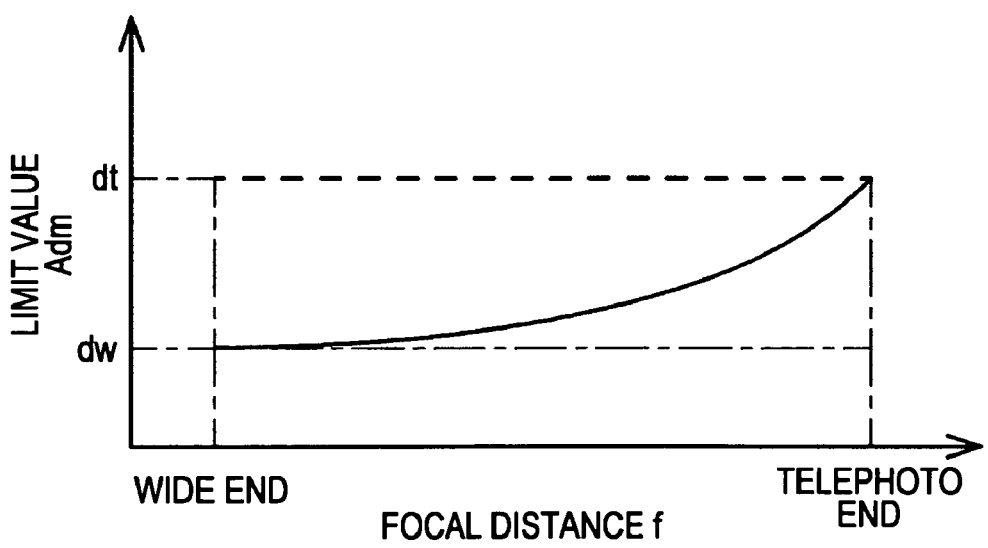
FIG. 3 is a diagram showing a relationship between a focal distance and a limit value of a displacement amount.

FIG. 3 is a diagram showing a relationship between a focal distance f and a limit value Adm of a displacement amount when the image deterioration amount Ae is suppressed to "RL". In addition, in FIG. 3, a horizontal axis denotes the focal distance f and a vertical axis denotes the limit value Adm of the displacement amount.

The limit value Adm of the displacement amount relative to the focal distance f becomes "dt" when the zoom position is at the telephoto side, as shown in FIG. 3. In addition, if the focal distance shortens and moves to the wide side, the limit value Adm of the displacement amount is decreased. If the focal distance shortens and moves to the wide end, the limit value Adm of the displacement amount becomes "dw". Accordingly, in order to suppress the image deterioration amount Ae to "RL", the maximum displacement range of the correction lens unit 113 is set to "dt" and the displacement range is limited according to the zoom position as denoted by a solid line of FIG. 3. If the displacement range is limited, for example, if shake is large when the zoom position is at the wide side, the displacement range is limited and the shake correction may not be performed. Accordingly, when shake is large, for example, the limit of the displacement range is released as denoted by a dotted line of FIG. 3, and the displacement range is set to the maximum displacement range such that the shake correction performance of the wide side is improved and a picked-up image subjected to shake correction is obtained. In addition, if the limit of the displacement range is greater than a value denoted by the dotted line, it is possible to improve shake correction performance at the telephoto side as well as at the wide side.

Here, if the limit of the displacement range is released so as to improve shake correction performance and the displacement state of the correction lens unit 113 is close to the limit of the displacement range, the correction lens unit 113 is in contact with a correction end when shake is large and thus shake correction may not be smoothly performed. In addition, the correction end regulates the displacement of the correction lens unit 113. Accordingly, in the arithmetic processing unit 51 for performing arithmetic of a shake-proof target position in the control unit 50, shake correction according to the displacement state or the zoom position of the correction lens unit 113 is performed and suitable shake correction is performed using a correction area effectively.

3. Configuration of Arithmetic Processing Unit

Figure 4:
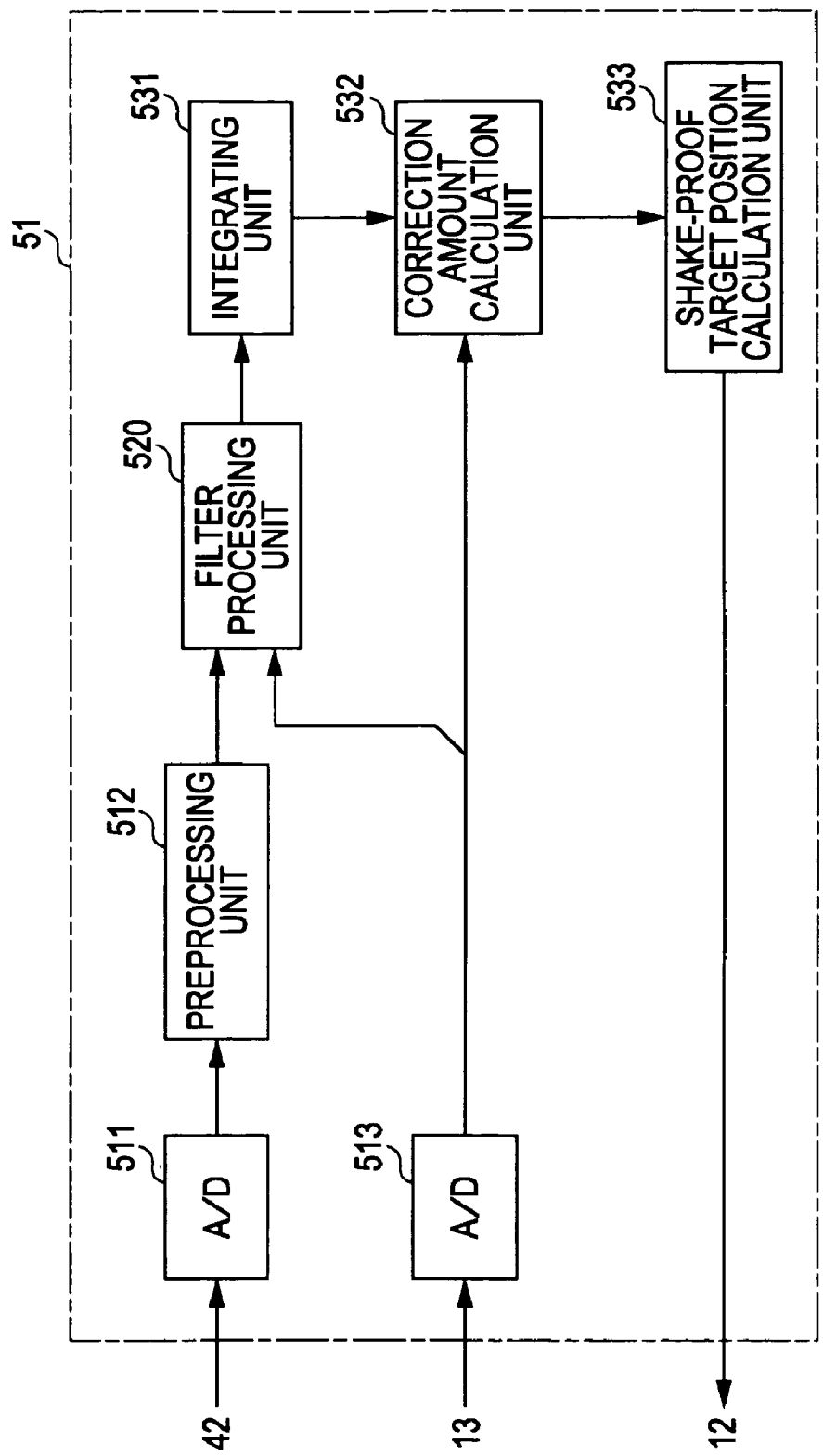
FIG. 4 is a diagram showing the configuration of an arithmetic processing unit.

FIG. 4 is a diagram showing the configuration of the arithmetic processing unit 51 for performing the arithmetic of the shake-proof target position in the control unit 50.

The position signal output from the imaging optical system sensor 13 is converted into a digital signal by an A/D conversion unit 513. In addition, a signal indicating the displacement state of the correction lens unit 113 (equal to the displacement position or the correction angle of the correction lens unit 113) in the position signal is supplied to a filter processing unit 520, and a signal indicating a zoom position is supplied to a correction amount calculation unit 532. A shake detection signal output from the shake detection unit 42 is converted into a digital signal by the A/D conversion unit 511 so as to be supplied to a preprocessing unit 512. In addition, if the shake detection signal output from the shake detection unit 42 is a digital signal, it is supplied to the preprocessing unit 512 without passing through the A/D conversion unit 511.

The preprocessing unit 512 performs a filter process of eliminating a DC component from the shake detection signal and the shake detection signal after the filter process to the filter processing unit 520.

The filter processing unit 520 switches filter processing characteristics when it is determined that the state in which the correction lens unit 113 is close to the limit of the displacement range is frequently generated based on the position signal and performs the filter process of the shake detection signal so as to perform suitable shake correction using the correction area effectively.

Figure 5:
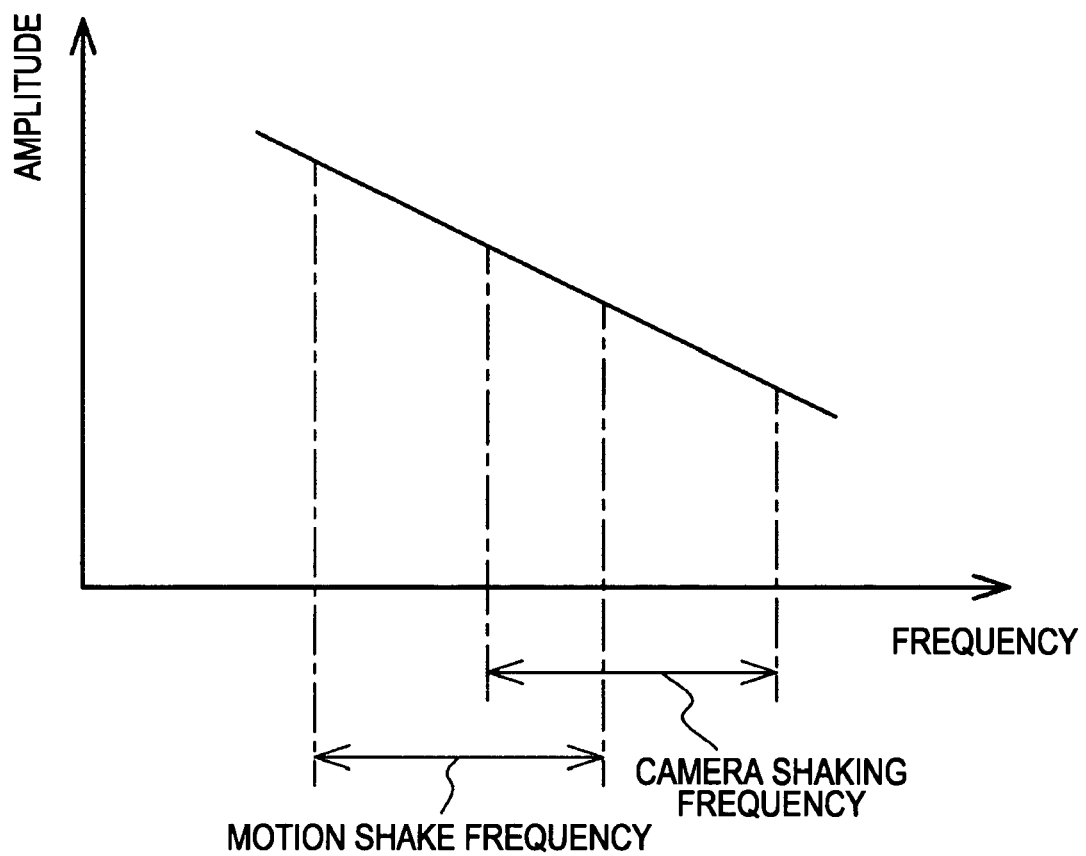
FIG. 5 is a diagram showing a relationship between the amplitude of a shake detection signal and the frequency of the shake detection signal.

FIG. 5 is a diagram showing a relationship between the amplitude of a shake detection signal and the frequency of the shake detection signal. For example, the frequency (camera shake frequency) of a shake detection signal which is generated by camera shake is distributed in a range of, for example, 1 to several tens Hz. In addition, the frequency (motion shake frequency) of a shake detection signal which is generated by vibration when the user picks up an image while walking is distributed in a range lower than the camera shake frequency. The amplitude of the shake detection signal which is generated by the camera shake or the vibration when picking up an image while walking is increased when the frequency is low.

Accordingly, the filter processing unit 520 changes the filter processing characteristics according to the displacement limit of the correction lens unit 113 and processes the shake detection signal such that the shake correction of the optical image is limited as the detected displacement state is close to the displacement limit. The filter processing unit 520 limits the frequency component corresponding to large vibration of the shake detection signal, that is, the low frequency component corresponding to large vibration as described with respect to FIG. 5, as the correction lens unit 113 is close to the displacement limit. The filter processing unit 520 limits the low frequency component as the correction lens unit 113 is close to the displacement limit, such that the correction lens unit 113 is largely displaced so as to be brought into contact with the correction end, thereby performing smooth shake correction. In addition, the filter processing unit 520 sequentially reinforces the limit of the low frequency component when the displacement state is closer to the displacement limit than a predetermined state and sequentially eases the limit when the displacement state is further separated from the displacement limit than the predetermined state. The filter processing unit 520 outputs the shake detection signal after the filter process to the integrating unit 531.

The integrating unit 531 integrates the shake detection signal after the filter process and calculates an angle. The correction amount calculation unit 532 and the shake-proof target position calculation unit 533 configure a correction control unit which displaces, for example, the correction lens unit 113 according to the shake detection signal subjected to the filter process and corrects the shake of the optical image on the imaging surface generated by the shake detected by the shake detection unit 42. The correction amount calculation unit 532 calculates a correction amount from the angle calculated by the integrating unit 531 and the zoom position indicated by the position signal. The shake-proof target position calculation unit 533 sets the correction lens unit 113 to the shake-proof target position, which may correct the movement of the position of the optical image on the imaging surface generated according to shake, to a shake-proof target position, based on the correction amount calculated by the correction amount calculation unit 532. In addition, a control signal in which the correction lens unit 113 is set to the shake-proof target position is generated and output to the driver 12.

4. First Configuration of Filter Processing Unit

Figure 6:
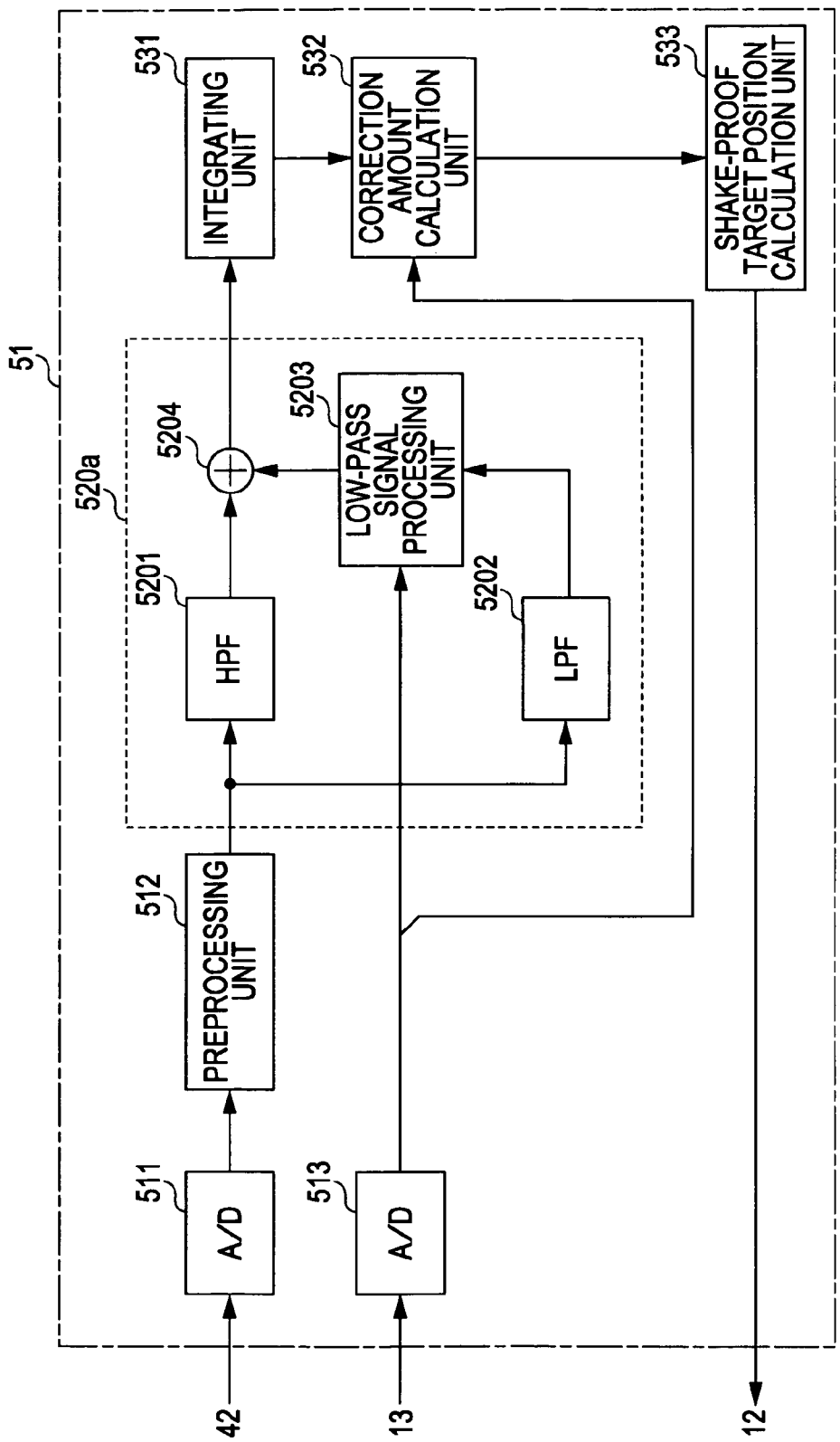
FIG. 6 is a diagram showing a first configuration of a filter processing unit.

FIG. 6 is a diagram showing a first configuration of the filter processing unit. The filter processing unit 520a limits the signal level of the low frequency component of the shake detection signal according to the displacement state of the correction lens unit 113.

The preprocessing unit 512 of the filter processing unit 520a supplies the shake detection signal after processing to a High-Pass Filter (HPF) 5201 and a Low-Pass Filter (LPF) 5202. The HPF 5201 extracts a high frequency component of the shake detection signal and outputs a high-pass signal to an adder 5204. The low-pass filter 5202 extracts a low frequency component of the shake detection signal and outputs a low-pass signal to a low-pass signal processing unit 5203.

The signal indicating the displacement state of the correction lens unit 113 is supplied to the low-pass signal processing unit 5203 of the filter processing unit 520a. The low-pass signal processing unit 5203 performs a signal level limiting process of the low-pass signal using a low-pass signal limit value and outputs a low-pass signal after processing to the adder 5204. The low-pass signal limit value is a threshold for limiting the signal level of the low-pass signal and may be changed within a range between predetermined upper limit values and lower limit values. The low-pass signal processing unit 5203 limits the signal level of the low-pass signal to the low-pass signal limit value and outputs the low-pass signal to the adder 5204, when the signal level of the low-pass signal exceeds the low-pass signal limit value. In addition, the low-pass signal processing unit 5203 switches the low-pass signal limit value according to the displacement state of the correction lens unit 113.

The upper limit value of the low-pass signal limit value is set from the level of amplitude of the low-pass signal which is desired to be subjected to shake correction. In addition, the lower limit value of the low-pass signal limit value is set to a proper value considering that the shake detection signal and the behavior of the lens do not lose continuity.

The adder 5204 adds the high-pass signal supplied from the HPF 5201 and the low-pass signal supplied from the low-pass signal processing unit 5203 and outputs the added result to the integrating unit 531 as the shake detection signal after filter processing.

5. Operation of First Configuration of Filter Processing Unit

Figure 7:
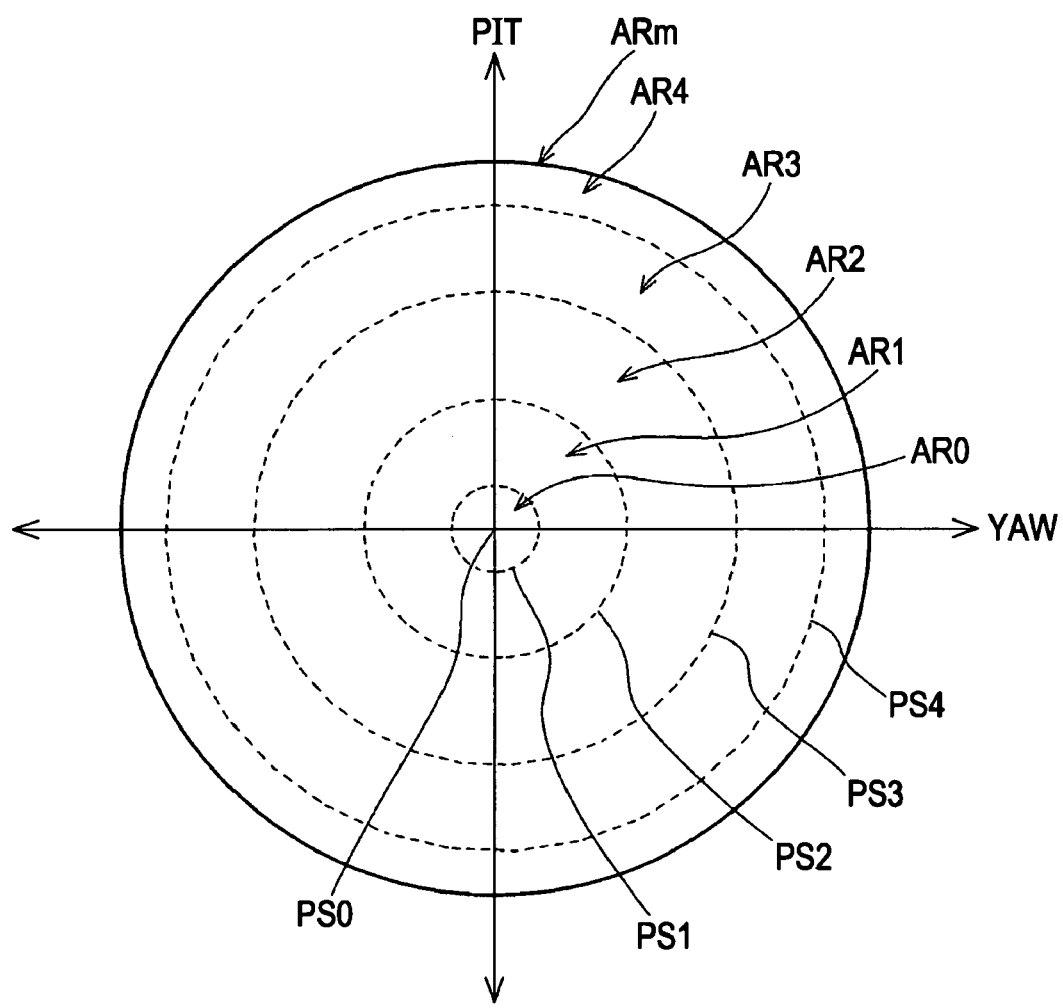
FIG. 7 is a diagram showing the case where the displacement range of a correction lens unit is divided into a plurality of areas.

FIG. 7 is a diagram showing the case where the correction area, that is, the displacement range of the correction lens unit 113 is divided into a plurality of areas. For example, in FIG. 7, the displacement range ARm is divided into five areas AR0, AR1, AR2, AR3 and AR4. In addition, the center of the displacement range ARm is set to a position PS0, the boundary between the area AR0 and the area AR1 is set to a position PS1, the boundary between the area AR1 and the area AR2 is set to a position PS2, the boundary between the area AR2 and the area AR3 is set to a position PS3, and the boundary between the area AR3 and the area AR4 is set to a position PS4.

FIG. 8 is a flowchart showing a switching operation of a low-pass signal limit value when the displacement range ARm is divided as shown in FIG. 7.

In step ST1, the low-pass signal processing unit 5203 determines whether the displacement state of the correction lens unit 113 is within the range of the area AR0. The low-pass signal processing unit 5203 progresses to step ST2 when the displacement state of the correction lens unit 113 is within the area AR0 and progresses to step ST3 when the displacement state is not within the area AR0.

In the step ST2, the low-pass signal processing unit 5203 performs a first limit easing process of the low-pass signal limit value. The low-pass signal processing unit 5203 adds a first limit adjustment amount to the current low-pass signal limit value and eases the signal level of the low-pass signal as the first limit easing process. In addition, the first limit adjustment amount is a value larger than a second limit adjustment amount used for the below-described second limit easing process. In addition, if the result of adding the first limit adjustment amount to the current low-pass signal limit value exceeds the upper limit value of the low-pass signal limit value, the low-pass signal processing unit 5203 sets the low-pass signal limit value to the upper limit value.

When the step ST1 progresses to the step ST3, in the step ST3, the low-pass signal processing unit 5203 determines whether the displacement state of the correction lens unit 113 is within the area AR1. The low-pass signal processing unit 5203 progresses to step ST4 when the displacement state of the correction lens unit 113 is within the area AR1 and progresses to step ST5 when the displacement state is not within the area AR1.

In the step ST4, the low-pass signal processing unit 5203 performs a second limit easing process of the low-pass signal limit value. The second limit easing process reduces the limit adjustment amount further than the first limit easing process so as to ease the limit of the signal level of the low-pass signal. The low-pass signal processing unit 5203 adds a second limit adjustment amount to the current low-pass signal limit value so as to ease the limit of the signal level of the low-pass signal as the second limit easing process. In addition, the second limit adjustment amount is a value smaller than the first limit adjustment amount used for the first limit easing process as described above. In addition, if the result of adding the second limit adjustment amount to the current low-pass signal limit value exceeds the upper limit value of the low-pass signal limit value, the low-pass signal processing unit 5203 sets the low-pass signal limit value to the upper limit value.

When the step ST3 progresses to the step ST5, in the step ST5, the low-pass signal processing unit 5203 determines whether the displacement state of the correction lens unit 113 is within the area AR2. The low-pass signal processing unit 5203 does not change the low-pass signal limit value when the displacement state of the correction lens unit 113 is within the area AR2. In addition, the low-pass signal processing unit 5203 progresses to step ST6 when the displacement state of the correction lens unit 113 is not within the area AR2.

When the step ST5 progresses to the step ST6, in the step ST6, the low-pass signal processing unit 5203 determines whether the displacement state of the correction lens unit 113 is within the area AR3. The low-pass signal processing unit 5203 progresses to step ST7 when the displacement state of the correction lens unit 113 is within the area AR3 and progresses to step ST8 when the displacement state is not within the area AR3, that is, the displacement state of the correction lens unit 113 is within the area AR4.

In the step ST7, the low-pass signal processing unit 5203 performs a second limit reinforcing process of the low-pass signal limit value. The low-pass signal processing unit 5203 subtracts a third limit adjustment amount from the current low-pass signal limit value so as to reinforce the limit of the signal level of the low-pass signal as a second limit reinforcing process. In addition, the third limit adjustment amount is a value smaller than a fourth limit adjustment amount used for the below-described fourth limit reinforcing process. In addition, if the result of subtracting the third limit adjustment amount from the current low-pass signal limit value exceeds the lower limit value of the low-pass signal limit value, the low-pass signal processing unit 5203 sets the low-pass signal limit value to the lower limit value.

In the step ST8, the low-pass signal processing unit 5203 performs a first limit reinforcing process of the low-pass signal limit value. The low-pass signal processing unit 5203 subtracts the fourth limit adjustment amount from the current low-pass signal limit value so as to reinforce the limit of the signal level of the low-pass signal as the first limit reinforcing process. In addition, the fourth limit adjustment amount is a value larger than the third limit adjustment amount used for the above-described third limit reinforcing process. In addition, if the result of subtracting the fourth limit adjustment amount from the current low-pass signal limit value exceeds the lower limit value of the low-pass signal limit value, the low-pass signal processing unit 5203 sets the low-pass signal limit value to the lower limit value.

The above-described process is repeatedly performed, for example, at an interval of sampling the displacement state of the correction lens unit 113, and a control signal for setting the correction lens unit 113 to the shake-proof target position is generated and supplied to the driver 12 based on the shake detection signal processed by the filter processing unit 520*a*.

Figures 9A, 9B:
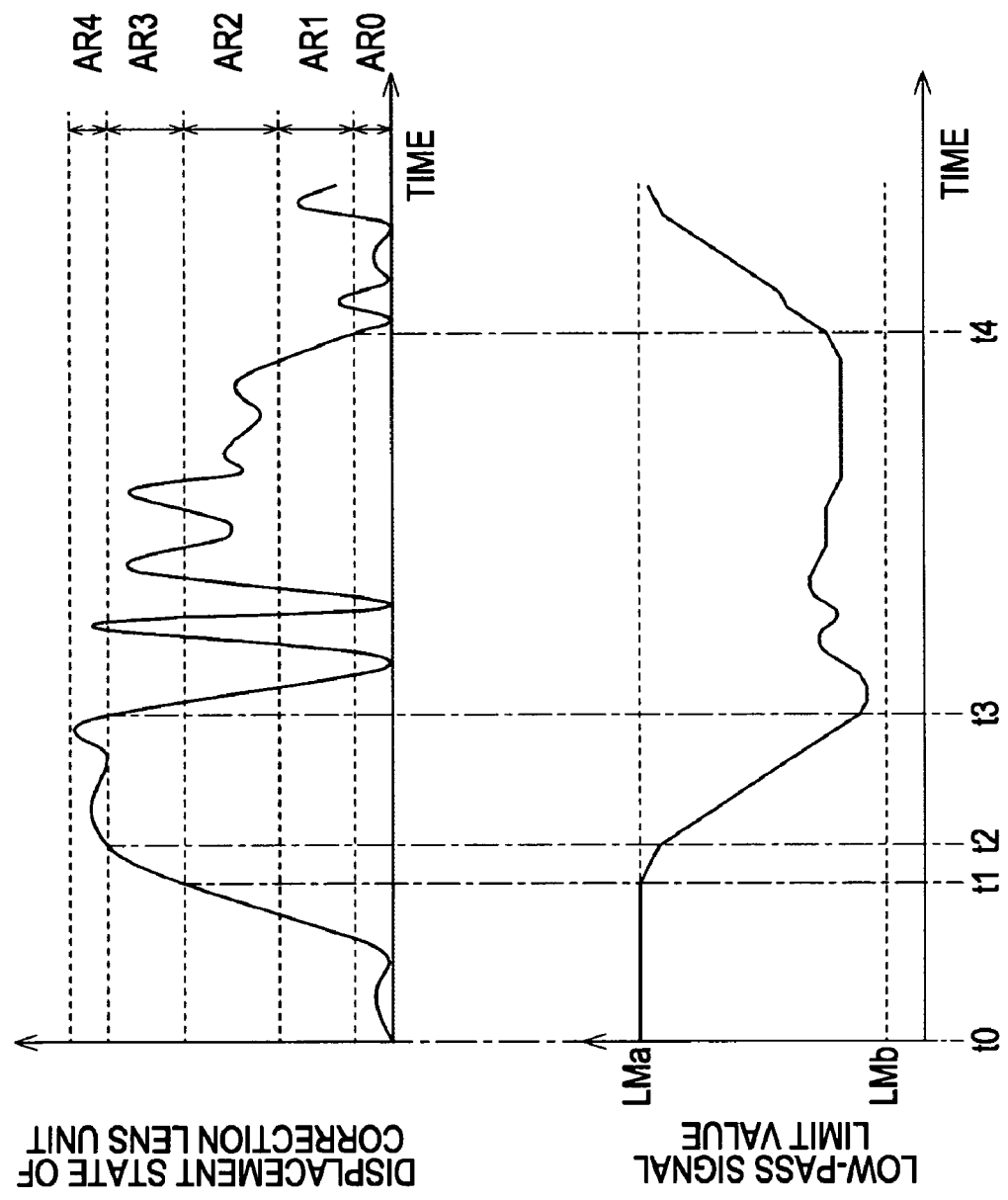
FIG. 9 is a diagram showing a switching operation of a low-pass signal limit value.

FIG. 9 is a diagram showing a switching operation of the low-pass signal limit value of the low-pass signal processing unit 5203. In addition, (A) of FIG. 9 shows the displacement state of the correction lens unit 113 which varies with time. (B) of FIG. 9 shows the low-pass signal limit value which varies with time. The displacement state of the correction lens unit 113 at the operation start time is, for example, within the area AR0, and the low-pass signal limit value is set to, for example, the upper limit value LMa. In addition, the lower limit value is "LMb".

If shake correction is performed and the displacement state of the correction lens unit 113 varies as shown in (A) of FIG. 9, the first limit easing process is performed in a period, in which the displacement state of the correction lens unit 113 is within the area AR0, from the operation start. Thereafter, when the displacement state of the correction lens unit 113 is within the area AR1, the second limit easing process is performed. Here, since the low-pass signal limit value at the time of the operation start is set to the upper limit value LMa, the low-pass signal limit value becomes the upper limit value LMa even when the first limit easing process or the second limit easing process is performed. In addition, when the displacement state of the correction lens unit 113 is within the area AR2, the limit easing process or the limit reinforcing process is not performed with respect to the low-pass signal limit value. Accordingly, in a period from a time point t0 at the time of the operation start to a time point t1 in which the displacement state of the correction lens unit 113 is moved into the area AR3, the low-pass signal limit value becomes the upper limit value LMa.

When the displacement state of the correction lens unit 113 is within the area AR3, the low-pass signal processing unit 5203 performs the second limit reinforcing process. Accordingly, in a period from the time point t1 to a time point t2 in which the displacement state of the correction lens unit 113 is within the area AR3, the second limit reinforcing process is repeatedly performed and the low-pass signal limit value is decreased with the elapse of time.

Thereafter, when the displacement state of the correction lens unit 113 is within the area AR4, the low-pass signal processing unit 5203 performs the first limit reinforcing process. Accordingly, in a period from the time point t2 to a time point t3 in which the displacement state of the correction lens unit 113 is within the area AR4, the first limit reinforcing process is repeatedly performed and the low-pass signal limit value is decreased with the elapse of time. In addition, the limit adjustment amount of the first limit reinforcing process is greater than that of the second limit reinforcing process. Accordingly, the variation in low-pass signal limit value when the displacement state of the correction lens unit 113 is within the area AR4 is greater than the variation in low-pass signal limit value when the displacement state of the correction lens unit 113 is within the area AR3.

In a period from the time point t3 to a time point t4, the displacement state of the correction lens unit 113 is mainly within the areas AR1, AR2 and AR3, and a period in which the displacement state is within the areas AR0 and AR4 is short. Since the period in which the displacement state is within the area AR1 and the period in which the displacement state is within the area AR3 may be alternately generated, a process in which the low-pass signal limit value is not significantly varied is performed. Thereafter, when the state in which the displacement state of the correction lens unit 113 is within the areas AR0 and AR1 is continuous after the time point t4, the low-pass signal limit value is gradually increased and the limit of the low-pass signal is eased.

The low-pass signal processing unit 5203 performs the limit easing process when the displacement state of the correction lens unit 113 is separated from the displacement limit and performs the limit reinforcing process when the displacement state of the correction lens unit 113 is close to the displacement limit. To this end, for example, if the signal level of the low frequency component of the shake detection signal is increased by picking up an image while walking, the limit of the low frequency component of the shake detection signal is sequentially eased when the displacement state of the correction lens unit 113 is separated from the displacement limit. Accordingly, shake due to vibration while walking can be corrected. In addition, as the displacement state of the correction lens unit 113 becomes close to the displacement limit, the limit of the low frequency component of the shake detection signal is sequentially reinforced. Therefore, shake correction in which the displacement of the correction lens unit 113 is large is not performed and thus suitable shake correction can be performed using the correction area effectively, compared with the related art.

6. Second Configuration of Filter Processing Unit

However, the process of limiting the signal level of the low-pass frequency of the shake detection signal according to the displacement state of the correction lens unit is not limited to the case of using the low-pass signal like the first configuration. For example, by switching the filter characteristics according to the displacement state of the correction lens unit, the low frequency component of the shake detection signal may be limited according to the displacement state of the correction lens unit.

Figure 10:
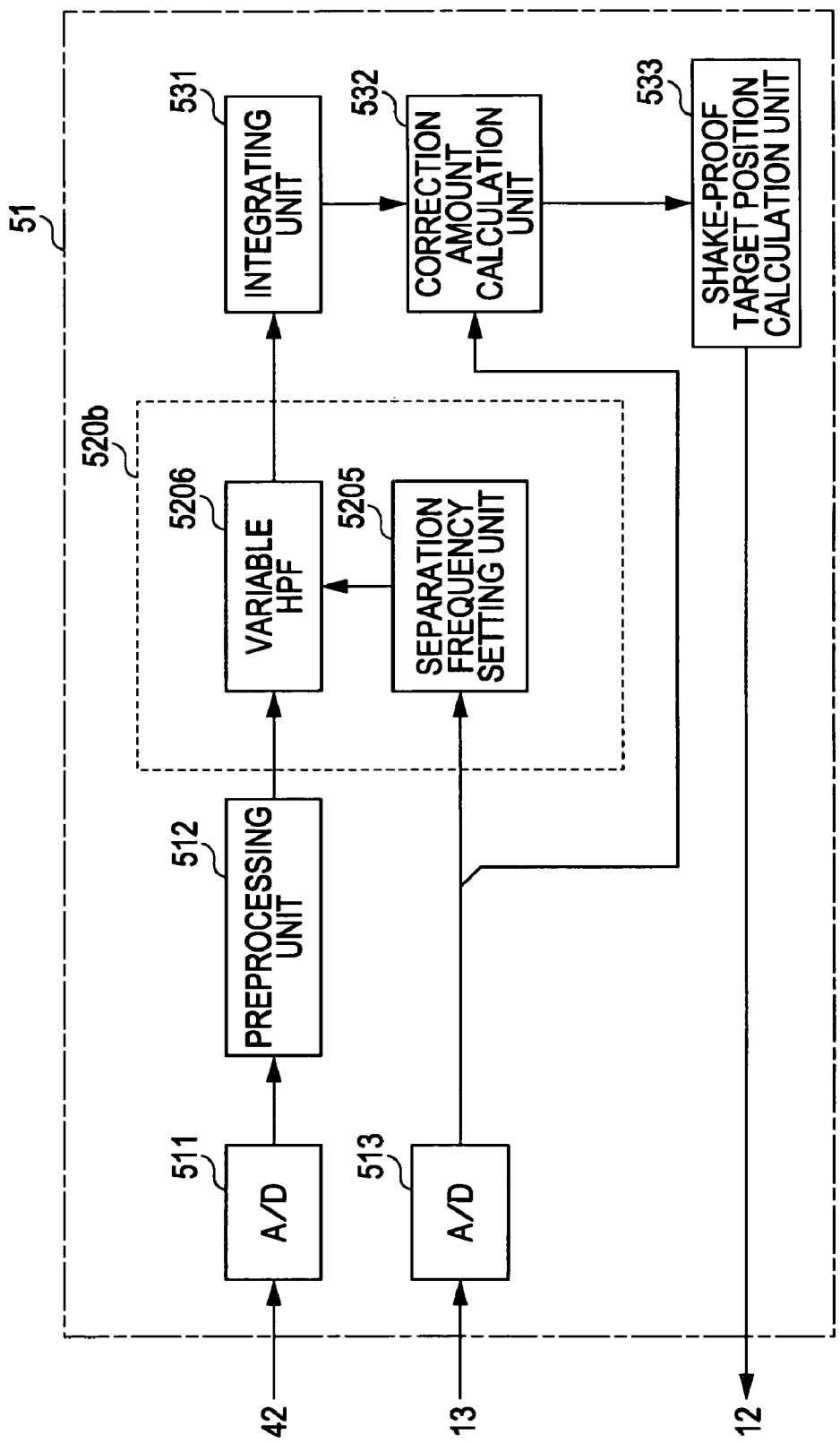
FIG. 10 is a diagram showing a second configuration of a filter processing unit.

Next, the case where the filter characteristics are switched according to the displacement state of the correction lens unit will be described as a second configuration of the filter processing unit. FIG. 10 is a diagram showing the second configuration of the filter processing unit.

The preprocessing unit 512 of the filter processing unit 520b supplies to the shake detection signal after processing to a variable High-Pass Filter (variable HPF) 5206. A signal indicating the displacement state of the correction lens unit 113 is supplied to a separation frequency setting unit 5205 of the filter processing unit 520b.

The separation frequency setting unit 5205 generates a filter setting value for setting a frequency component limited by the variable HPF 5206 and outputs the filter setting value to the variable HPF 5206, based on the signal indicating the displacement state of the correction lens unit 113.

The variable HPF 5206 sets the filter characteristics based on the filter setting value supplied from the separation frequency setting unit 5205 and performs the filter process of the shake detection signal by the set filter characteristics. In addition, the variable HPF 5206 outputs the shake detection signal after the filter process to the integrating unit 531.

Figure 11:
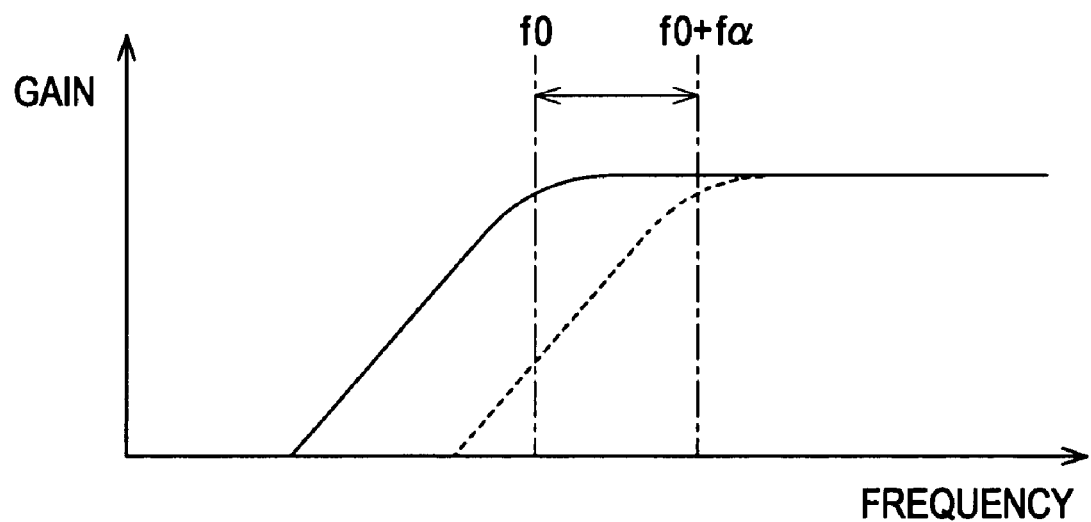
FIG. 11 is a diagram showing the setting of a cutoff frequency.

As shown in FIG. 11, the variable HPF 5206 sets, for example, a cutoff frequency based on the filter setting value. The variable HPF 5206 sets the cutoff frequency to "f0" when the filter setting value is the low limit value "FS". In addition, when the filter setting value is increased so as to become the upper limit value "FS+α", the cutoff frequency is increased to "f0+fα" and the limited low frequency component is increased.

Since the lower limit value of the filter setting value is a low value so as not to perform cutoff from the viewpoint in which there are various types of shakes, the cutoff frequency is set to a small value, for example, 0 to 0.1 Hz. Since the upper limit value of the filter setting value can correct shake in a small range with a small amplitude, which becomes nervous, of the camera shake components while obtaining the cutoff effect, the cutoff frequency is set to, for example, 3 to 4 Hz.

7. Operation of Second Configuration of Filter Processing Unit

Figure 12:
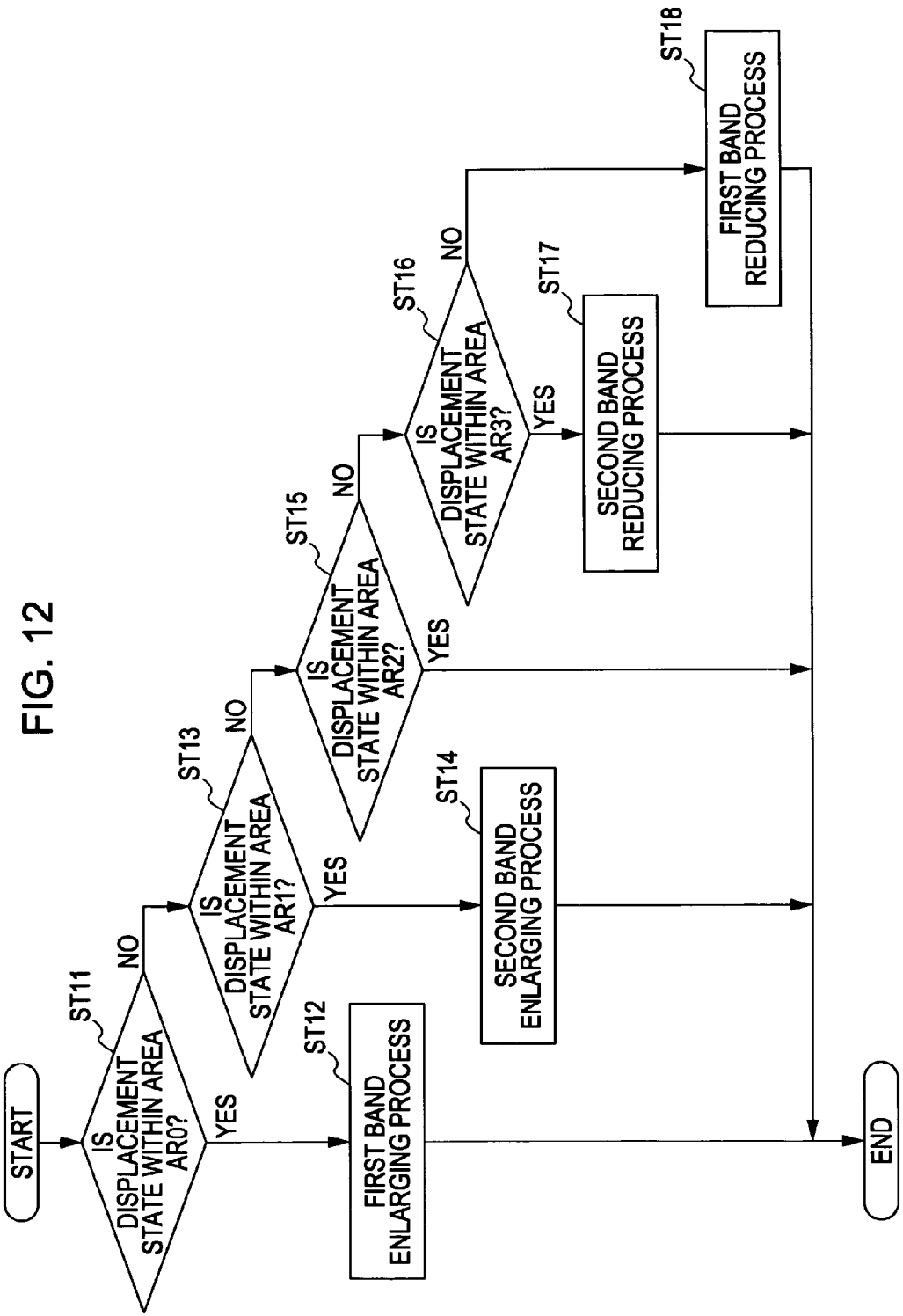
FIG. 12 is a flowchart showing a switching operation of a filter setting value.

FIG. 12 is a flowchart showing a switching operation of the filter setting value when the displacement range ARm is divided as shown in FIG. 7. The filter setting value and the filter characteristics of the variable HPF 5206 have a relationship shown in FIG. 10.

In step ST11, the separation frequency setting unit 5205 determines whether or not the displacement state of the correction lens unit 113 is within the area AR0. The separation frequency setting unit 5205 progresses to step ST12 when the displacement state of the correction lens unit 113 is within the area AR0 and progresses to step ST13 when the displacement state is not within the area AR0.

In the step ST12, the separation frequency setting unit 5205 performs a first band enlarging process. The separation frequency setting unit 5205, for example, subtracts a first setting adjustment amount from a current filter setting value so as to reduce the filter setting value as the first band enlarging process. In addition, the first setting adjustment amount is a value larger than a second setting adjustment amount used for the below-described second band enlarging process. In addition, if the result of subtracting the first setting adjustment amount from the current filter setting value is smaller than a lower limit value, the separation frequency setting unit 5205 sets the filter setting value to the lower limit value.

When the step ST11 progresses to the step ST13, in the step ST13, the separation frequency setting unit 5205 determines whether or not the displacement state of the correction lens unit 113 is within the area AR1. The separation frequency setting unit 5205 progresses to step ST14 when the displacement state of the correction lens unit 113 is within the area AR1 and progresses to step ST15 when the displacement state is not within the area AR1.

In the step ST14, the separation frequency setting unit 5205 performs a second band enlarging process. The second band enlarging process further reduces a setting adjustment amount than the first band enlarging process so as to enlarge a pass band. The separation frequency setting unit 5205, for example, subtracts a second setting adjustment amount from the current filter setting value so as to reduce the filter setting value as the second band enlarging process. In addition, the second setting adjustment amount is a value smaller than the first setting adjustment amount used for the above-described first band enlarging process. In addition, if the result of subtracting the second setting adjustment amount from the current filter setting value is smaller than the lower limit value, the separation frequency setting unit 5205 sets the filter setting value to the lower limit value.

When the step ST13 progresses to the step ST15, in the step ST15, the separation frequency setting unit 5205 determines whether or not the displacement state of the correction lens unit 113 is within the area AR2. The separation frequency setting unit 5205 does not change the band when the displacement state of the correction lens unit 113 is within the area AR2. In addition, the separation frequency setting unit 5205 progresses to step ST16 when the displacement state of the correction lens unit 113 is not within the area AR2.

When the step ST15 progresses to the step ST16, in the step ST16, the separation frequency setting unit 5205 determines whether or not the displacement state of the correction lens unit 113 is within the area AR3. The separation frequency setting unit 5205 progresses to step ST17 when the displacement state of the correction lens unit 113 is within the area AR3 and progresses to step ST18 when the displacement state is not within the area AR3, that is, when the displacement state of the correction lens unit 113 is within the area AR4.

In the step ST17, the separation frequency setting unit 5205 performs a second band reducing process. The separation frequency setting unit 5205 adds a third setting adjustment amount to the current filter setting value so as to increase the filter setting value, as the second band reducing process. In addition, the third setting adjustment amount is a value smaller than a fourth setting adjustment amount used for the below-described first band reducing process. In addition, if the result of adding the third setting adjustment amount to the current filter setting value is larger than an upper limit value, the separation frequency setting unit 5205 sets the filter setting value to the upper limit value.

In the step ST18, the separation frequency setting unit 5205 performs a first band reducing process. The separation frequency setting unit 5205 adds a fourth setting adjustment amount to the current filter setting value so as to increase the filter setting value, as the first band enlarging process. In addition, the fourth setting adjustment amount is a value larger than the third setting adjustment amount used for the above-described second band reducing process. In addition, if the result of adding the fourth setting adjustment amount to the current filter setting value is larger than the upper limit value, the separation frequency setting unit 5205 sets the filter setting value to the upper limit value.

The above-described process is repeatedly performed, for example, at an interval of sampling the displacement state of the correction lens unit 113, and a control signal for setting the correction lens unit 113 to the shake-proof target position is generated and supplied to the driver 12 based on the shake detection signal processed by the filter processing unit 520b.

Figures 13A, 13B:
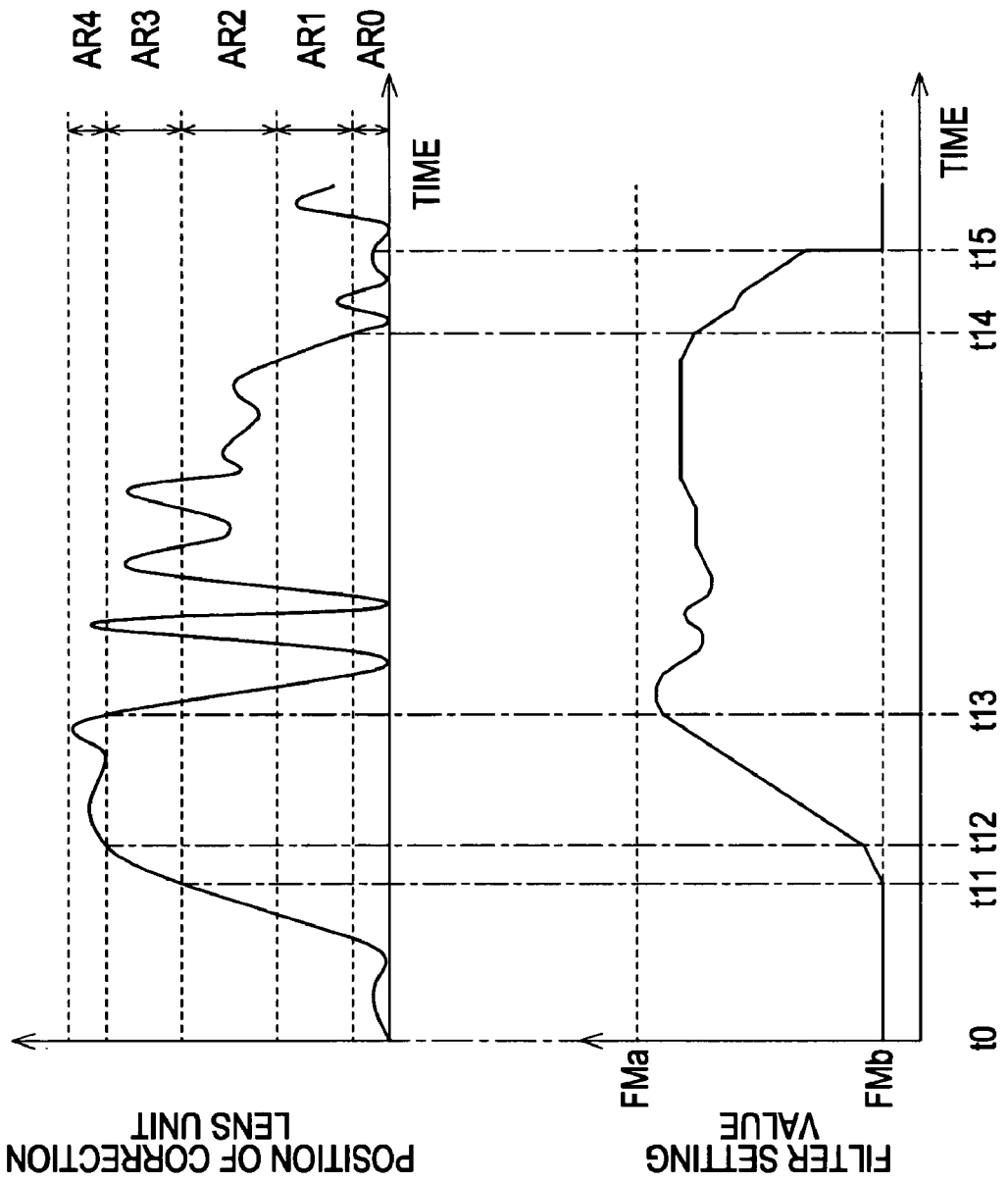
FIG. 13 is a diagram showing a switching operation of a filter setting value.

FIG. 13 is a diagram showing a switching operation of the filter setting value of the separation frequency setting unit 5205. In addition, (A) of FIG. 13 shows the displacement state of the correction lens unit 113 which varies with time. (B) of FIG. 13 shows the filter setting value which varies with time. The displacement state of the correction lens unit 113 at the time of operation start is, for example, within the area AR0, and the filter setting value is set to, for example, the lower limit value FMb. In addition, the upper limit value is "FMa".

If shake correction is performed and the displacement state of the correction lens unit 113 varies as shown in (A) of FIG. 13, the first band enlarging process is performed in a period, in which the displacement state of the correction lens unit 113 is within the area AR0, from the operation start. Thereafter, when the displacement state of the correction lens unit 113 is within the area AR1, the second band enlarging process is performed. Here, since the filter setting value at the time of the operation start is set to the lower limit value, the filter setting value becomes the lower limit value even when the first band enlarging process or the second band enlarging process is performed. In addition, when the displacement state of the correction lens unit 113 is within the area AR2, the band enlarging process or the band reducing process is not performed. Accordingly, in a period from a time point t0 at the time of the operation start to a time point t11 in which the displacement state of the correction lens unit 113 is moved into the area AR3, the filter setting value becomes the lower limit value FMb.

When the displacement state of the correction lens unit 113 is within the area AR3, the separation frequency setting unit 5205 performs the second band reducing process. Accordingly, in a period from the time point t11 to a time point t12 in which the displacement state of the correction lens unit 113 is within the area AR3, the second band reducing process is repeatedly performed and the filter setting value is increased with the elapse of time.

Thereafter, when the displacement state of the correction lens unit 113 is within the area AR4, the separation frequency setting unit 5205 performs the first band reducing process. Accordingly, in a period from the time point t12 to a time point t13 in which the displacement state of the correction lens unit 113 is within the area AR4, the first band reducing process is repeatedly performed and the filter setting value is increased with the elapse of time. In addition, the setting adjustment amount of the first band reducing process is greater than that of the second band reducing process. Accordingly, the variation in filter setting value when the displacement state of the correction lens unit 113 is within the area AR4 is greater than the variation in filter setting value when the displacement state of the correction lens unit 113 is within the area AR3.

In a period from the time point t13 to a time point t14, the displacement state of the correction lens unit 113 is mainly within the areas AR1, AR2 and AR3, and a period in which the displacement state is within the areas AR0 and AR4 is short. Since the period in which the displacement state is within the area AR1 and the period in which the displacement state is within the area AR3 may be alternately generated, a process in which the filter setting value is not significantly varied is performed. Thereafter, when the state in which the displacement state of the correction lens unit 113 is within the areas AR0 and AR1 is continuous after the time point t14, the filter setting value is gradually decreased and the pass band of the variable HPF is widened.

In addition, when the state in which the displacement state of the correction lens unit 113 is within the area AR0 is continuously maintained in a predetermined period so as to reach a time point t15, the filter setting value may be set to the lower limit value FMb by subtracting a large value from the filter setting value. In this case, it is possible to perform transition at a high speed.

The separation frequency setting unit 5205 performs the band enlarging process with respect to the variable HPF 5206 when the displacement state of the correction lens unit 113 is separated from the displacement limit. That is, the separation frequency setting unit 5205 performs the band enlarging process so as to ease the limit of the low frequency component of the shake detection signal. In addition, the separation frequency setting unit 5205 performs the band reducing process with respect to the variable HPF 5206 when the displacement state of the correction lens unit 113 is close to the displacement limit. That is, the separation frequency setting unit 5205 performs the band reducing process so as to reinforce the limit of the low frequency component of the shake detection signal. To this end, for example, if the signal level of the low frequency component of the shake detection signal is increased by picking up an image while walking, the limit of the low frequency component of the shake detection signal is sequentially eased when the displacement state of the correction lens unit 113 is separated from the displacement limit. Accordingly, shake due to vibration while walking can be corrected. In addition, as the displacement state of the correction lens unit 113 becomes close to the displacement limit, the limit of the low frequency component of the shake detection signal is sequentially reinforced. Therefore, shake correction in which the displacement of the correction lens unit 113 is large is not performed and thus suitable shake correction can be performed using the correction area effectively, compared with the related art.

8. Third Configuration of Filter Processing Unit

Figure 14:
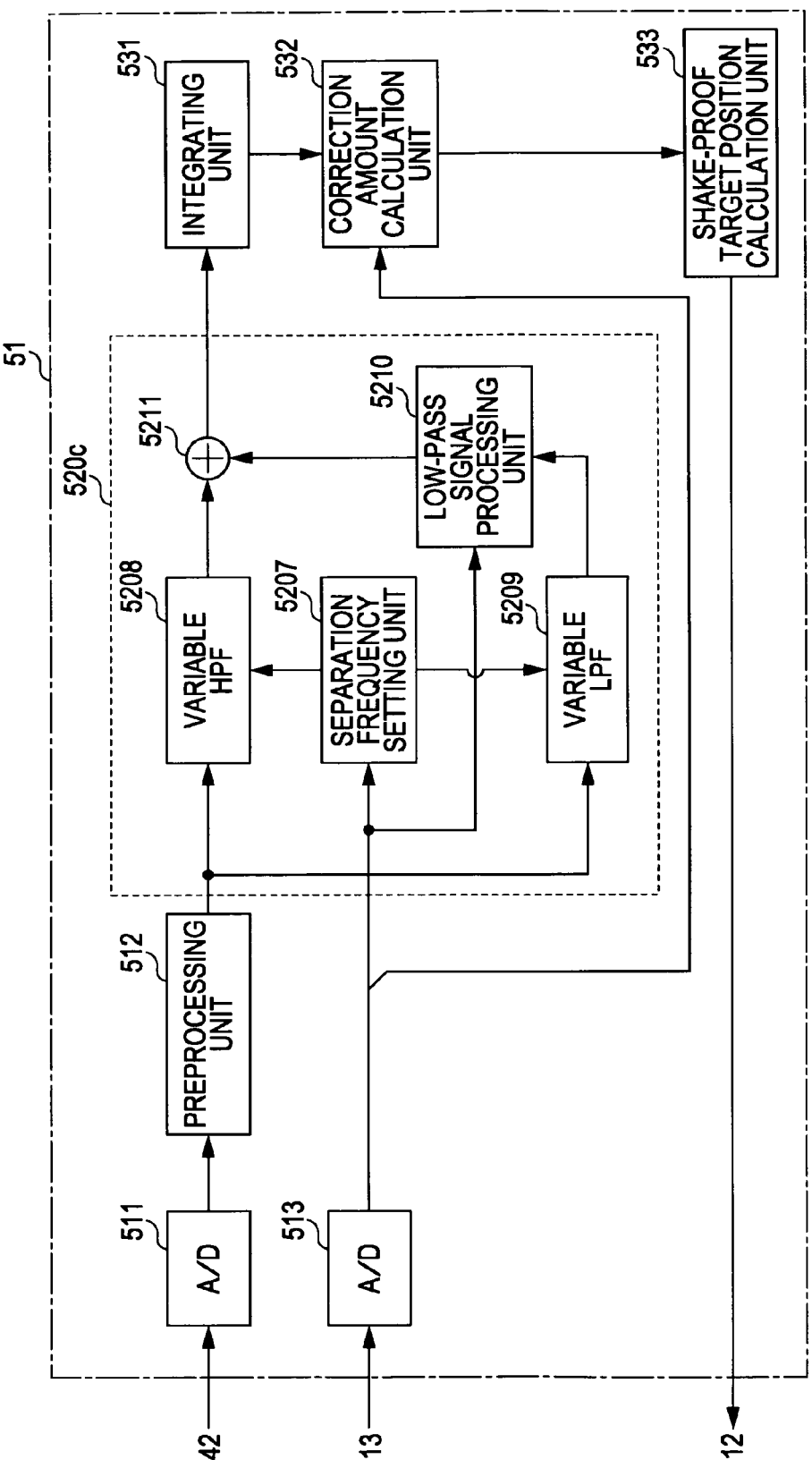
FIG. 14 is a diagram showing a third configuration of a filter processing unit.

FIG. 14 is a diagram showing a third configuration of the filter processing unit. A filter processing unit 520c shown in the third configuration performs the band adjustment of the variable HPF for performing the limit of the low-pass signal obtained by filter processing the shake detection signal and the filter process of the shake detection signal.

A preprocessing unit 512 supplies to the shake detection signal after processing to a variable High-Pass Filter (variable HPF) 5208 and a variable Low-Pass Filter (variable LPF) 5209. A signal indicating the displacement state of the correction lens unit 113 is supplied to a separation frequency setting unit 5207 and a low-pass signal processing unit 5210.

The separation frequency setting unit 5207 generates a filter setting value for setting a frequency component limited by the variable HPF 5208 and outputs the filter setting value to the variable HPF 5208, based on the signal indicating the displacement state of the correction lens unit 113. In addition, the separation frequency setting unit 5207 generates a filter setting value for setting a frequency component limited by the variable LPF 5209 and outputs the filter setting value to the variable LPF 5209, based on the signal indicating the displacement state of the correction lens unit 113.

The variable HPF 5208 sets the filter characteristics based on the filter setting value supplied from the separation frequency setting unit 5207 and performs the filter process of the shake detection signal by the set filter characteristics. In addition, the variable HPF 5208 outputs the high-pass signal, which is the shake detection signal after the filter process, to an adder 5211.

The variable LPF 5209 sets the filter characteristics based on the filter setting value supplied from the separation frequency setting unit 5207 and performs the filter process of the shake detection signal by the set filter characteristics. In addition, the variable LPF 5209 outputs the low-pass signal, which is the shake detection signal after the filter process, to the low-pass signal processing unit 5210.

The low-pass signal processing unit 5210 performs a signal level limiting process of the low-pass signal using a low-pass signal limit value and outputs the low-pass signal after the process to the adder 5211.

The adder 5211 adds the high-pass signal supplied from the variable HPF 5208 and the low-pass signal supplied from the low-pass signal processing unit 5210 and outputs the added result to an integrating unit 531 as the shake detection signal after the filter process.

If the filter processing unit 520c is configured as described above, the pass band of the variable LPF 5209 or the low-pass signal of the low-pass signal processing unit 5210 is limited such that the shake detection signal when, for example, a panning operation or a tilting operation is performed is limited. In addition, for example, the pass band of the variable HPF 5208 is controlled such that the shake detection signal when, for example, a framing operation is performed is passed.

In the panning operation or the tilting operation, shake is large and the shake frequency is low. In the framing operation, shake is large and the shake frequency is higher than that of the panning operation or the tilting operation. Accordingly, with respect to the framing operation, the limit of shake correction when the correction lens unit 113 is located at the end side of the displacement range is performed by the separation frequency setting unit 5207 and the variable HPF 5208. When the correction lens unit 113 is located at the center side of the displacement range, shake generated at the time of the framing operation is corrected. In addition, with respect to the panning operation or the tilting operation, shake correction is limited by the separation frequency setting unit 5207 or the variable LPF 5209 and the low-pass signal processing unit 5210.

When such processing is performed, shake correction is performed because the correction lens unit is located at the center side of the displacement range at the time of the start of the framing operation. However, if the framing operation is continuously performed such that the correction lens unit reaches the end side of the displacement range, the shake correction is limited in a natural manner. Accordingly, it is possible to perform an operation for correcting shake without interrupting the framing operation. When the panning operation or the tilting operation is performed, the shake of the optical image on the imaging surface occurring through these operations is not corrected, and a picked-up image in which a subject is smoothly moved according to the panning operation or the tilting operation can be obtained.

Since the correction angle of the correction lens unit can be increased at the wide side, the displacement range of the correction lens unit is large. Thus, it is difficult to determine that the correction lens unit is located at the end side of the displacement range, compared with at the telephoto side. That is, it is difficult to perform the limit of the low-pass frequency or the frequency limit for increasing the cutoff frequency to the high-pass frequency. That is, when the zoom displacement state becomes the telephoto side such that the correction angle is reduced, although the same shake detection signal as the wide end is input, it is easy to determine that the correction lens unit is located at the end side of the displacement range if it becomes the telephoto side and thus the operation for limiting the low frequency component of the shake detection signal is performed. That is, when the correction range is small if it becomes telephoto end, the low-pass limiting process in which shake correction is not performed excluding a small shake signal which is generated in a state in which a photographer is stopped is performed. Thus, suitable shake correction can be simply performed at a high speed according to the zoom displacement state.

The present invention is not limited to the above-described embodiments of the present invention. For example, if the shake of the optical image on the imaging surface generated by the shake detected by the shake detection unit is corrected by displacing the relative positional relationship between the lens unit and the imaging device according to the filter-processed shake detection signal, the present invention is not limited to the above-described configurations. For example, the imaging device may be displaced. In addition, if the shake detection unit can detect the shake of the imaging device, the present invention is not limited to the configuration using the angular speed sensor or the acceleration sensor as described above. For example, the shake of the imaging apparatus may be detected from the picked-up image.

In an imaging apparatus in which a lens may be replaced, the shake correction device may be provided at the lens side or the shake correction device may be provided at the main body side of the imaging apparatus. In addition, a portion of the shake correction device, for example, only a correction lens unit and a driving unit for driving the correction lens unit may be provided at the lens side and the other components may be provided at the main body side of the imaging apparatus. In addition, in addition to the case where the correction lens unit is displaced, the imaging device may be displaced based on a detection signal from a vibration detection unit so as to correct the shake of the optical image formed on the imaging surface of the imaging device.

The embodiments of the present invention disclose the present invention in the exemplary form. It is apparent to those skilled in the art that the embodiments may be modified or replaced without departing from the scope of the present invention. That is, in order to determine the spirit of the present invention, claims are considered.

What is claimed is:

1. A shake correction device comprising:
    a shake detection unit detecting shake so as to generate a shake detection signal;
    a driving unit displacing a relative positional relationship between a lens unit and an imaging device with respect to an optical axis so as to displace the position on the imaging surface of an optical image formed on an imaging surface of the imaging device;
    a displacement detection unit detecting a displacement state of the correction lens unit or the imaging device;
    a filter processing unit performing a filter process of the shake detection signal; and
    a correction control unit displacing the relative positional relationship between the lens unit and the imaging device according to the filter-processed shake detection signal so as to correct the shake of the optical image on the imaging surface generated by the shake detected by the shake detection unit,
    wherein the filter processing unit changes filter processing characteristics according to the displacement state detected by the displacement detection unit, and limits the shake correction of the optical image as the detected displacement state becomes close to a displacement limit, and
    wherein a displacement range of the correction lens unit is divided into a multiple of areas comprising a first area in which a first limit easing process is performed, a second area within which a second limit easing process is performed, a third area in which a first limit reinforcing process is performed, a fourth area in which a second limit reinforcing process is performed, and a fifth area in which no limit easing process and no limit reinforcing process is performed.

2. The shake correction device according to claim 1, wherein the filter processing unit limits a low frequency component of the shake detection signal as the displacement state becomes close to the displacement limit so as to limit the shake correction of the low frequency component.

3. The shake correction device according to claim 2, wherein the filter processing unit sequentially reinforces the limit of the low frequency component when the displacement state is close to the displacement limit rather than a predetermined state and sequentially eases the limit when the displacement state is separated from the displacement limit rather than the predetermined state.

4. The shake correction device according to claim 3, wherein the filter processing unit limits the signal level of the low frequency component of the shake detection signal so as to limit the low frequency component.

5. The shake correction device according to claim 3, wherein the filter processing unit performs a high-pass filter process, and increases a cutoff frequency of the high-pass filter process so as to limit the low frequency component.

6. The shake correction device according to claim 3, wherein the filter processing unit performs a high-pass filter process and a low-pass filter process, increases a cutoff frequency of the high-pass filter process, and limits the signal level of the low frequency component obtained by the low-pass filter process so as to limit the low frequency component.

7. A shake correction method comprising the steps of:
    detecting shake so as to generate a shake detection signal by a shake detection unit;
    displacing a relative positional relationship between a lens unit and an imaging device with respect to an optical axis so as to displace the position on the imaging surface of an optical image formed on an imaging surface of the imaging device, by a driving unit;
    detecting a displacement state of the correction lens unit or the imaging device, by a displacement detection unit;

performing a filter process of the shake detection signal, by a filter processing unit; and displacing the relative positional relationship between the lens unit and the imaging device according to the filter-processed shake detection signal so as to correct the shake of the optical image on the imaging surface generated by the shake detected by the shake detection unit, by a correction control unit, wherein, in the step of performing the filter process, filter processing characteristics are changed according to the displacement state detected in the step of detecting the displacement state, and the shake correction of the optical image is limited as the detected displacement state becomes close to a displacement limit, and wherein a displacement range of the correction lens unit is divided into a multiple of areas comprising a first area in which a first limit easing process is performed, a second area within which a second limit easing process is performed, a third area in which a first limit reinforcing process is performed, a fourth area in which a second limit reinforcing process is performed, and a fifth area in which no limit easing process and no limit reinforcing process is performed.

8. An imaging apparatus comprising:

a shake detection unit detecting shake so as to generate a shake detection signal;

a driving unit displacing a relative positional relationship between a lens unit and an imaging device with respect to an optical axis so as to displace the position on the imaging surface of an optical image formed on an imaging surface of the imaging device;

a displacement detection unit detecting a displacement state of the correction lens unit or the imaging device;

a filter processing unit performing a filter process of the shake detection signal;

a signal processing unit performing a camera signal process using an image signal generated by the imaging device; and a correction control unit displacing the relative positional relationship between the lens unit and the imaging device according to the filter-processed shake detection signal so as to correct the shake of the optical image on the imaging surface generated by the shake detected by the shake detection unit, wherein the filter processing unit changes filter processing characteristics according to the displacement state detected by the displacement detection unit, and limits the shake correction of the optical image as the detected displacement state becomes close to a displacement limit, and wherein a displacement range of the correction lens unit is divided into a multiple of areas comprising a first area in which a first limit easing process is performed, a second area within which a second limit easing process is performed, a third area in which a first limit reinforcing process is performed, a fourth area in which a second limit reinforcing process is performed, and a fifth area in which no limit easing process and no limit reinforcing process is performed.

* * * * *